Oct. 10, 1944.  E. N. OLSON  2,360,157
OSCILLATION DAMPER
Filed Dec. 31, 1943
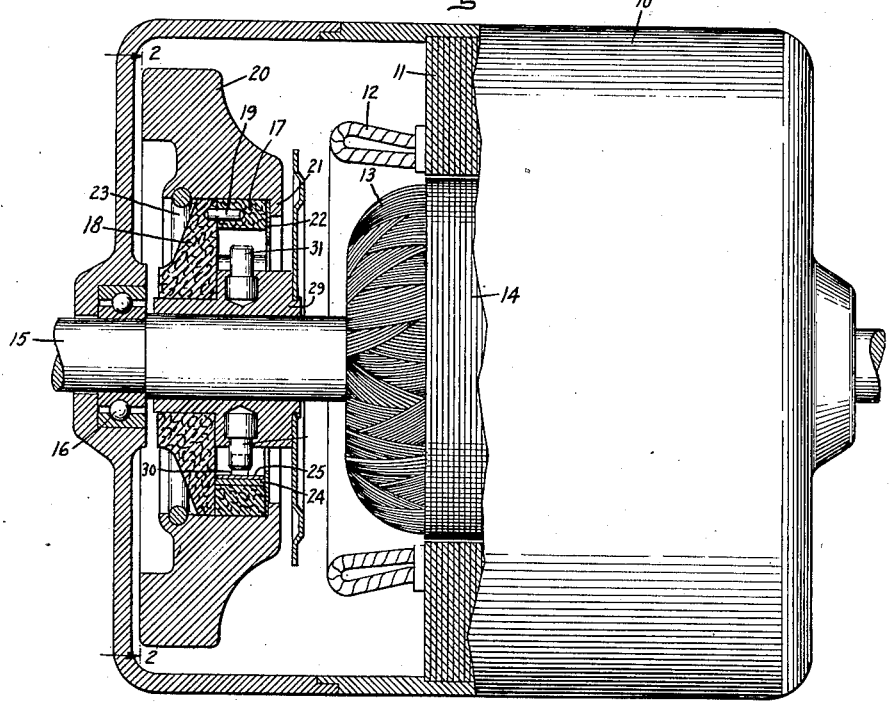
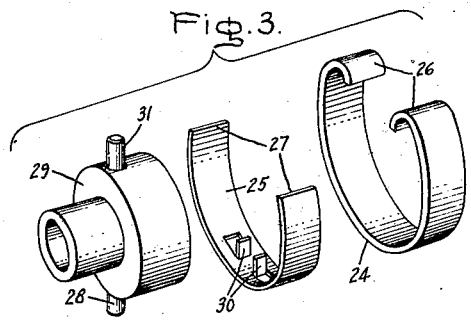
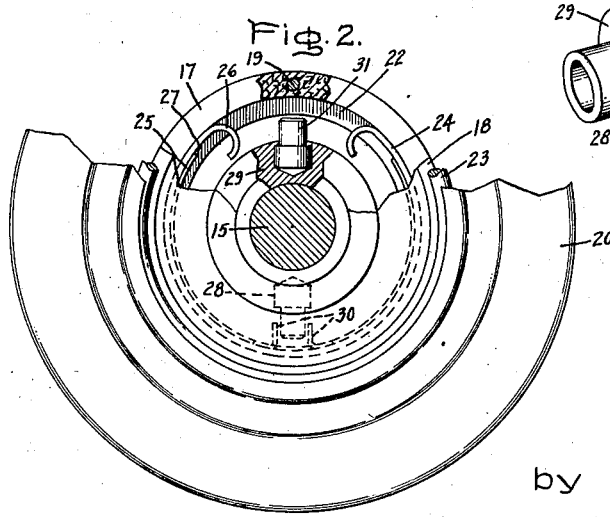
Inventor:
Edwin N. Olson,
by Harry E. Dunham
His Attorney.

Patented Oct. 10, 1944

2,360,157

UNITED STATES PATENT OFFICE 2,360,157

OSCILLATION DAMPER

Edwin N. Olson, Schenectady, N. Y., assignor to General Electric Company, a corporation of New York Application December 31, 1943, Serial No. 516,579

10 Claims. (Cl. 74—574)

My invention relates to oscillation dampers and particularly to a damper which is adapted to provide a small amount of frictional braking for relatively small oscillations and a larger damping effect for larger oscillations.

An object of my invention is to provide an improved oscillation damper for a rotatable shaft.

Another object of my invention is to provide an improved oscillation damper arranged to dampen relatively small oscillations by a relatively small friction braking force and to dampen larger oscillations with a relatively larger frictional damping force.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly broken away, of a dynamoelectric machine provided with an embodiment of my oscillation damper; Fig. 2 is a view taken along line 2—2 of Fig. 1, partly broken away, to show the details of the construction of the oscillation damper mechanism; and Fig. 3 is an exploded perspective view showing the damping springs and engaging shaft hub.

Referring to the drawing, I have shown a dynamoelectric machine provided with a stationary member 10 having a core 11 and a winding 12 arranged in winding slots in the core 11. This machine is provided with a rotatable member having a winding 13 arranged in winding slots of a core 14 supported on a rotatable shaft 15 mounted in bearings 16 supported in bearing housings in the stationary member 10. The rotatable shaft 15 may be subject to oscillations, and it is desirable to minimize the effect of these oscillations to provide for smoother operation of the machine. In order to dampen these oscillations, an oscillation damper is mounted on the rotatable shaft 15 and includes a hub 16 secured to the shaft 15 and rotatable therewith. A brake band 17 of suitable material, such as fiber, is arranged about the hub 16 and is radially spaced therefrom. This brake band 17 is rotatably supported relative to the shaft 15 and hub 16 by a mounting disk 18, to which the brake band 17 is secured by a pin 19. A flywheel 20 is mounted about the brake band 17 and is supported on the mounting element 18, so as to be rotatable with the brake band 17 as a unitary flywheel member. The flywheel 20 is formed with an inwardly extending flange 21 arranged in engagement with an annular retaining ring 22 which abuts against an outer edge of the brake band 17, and a retaining spring 23 is arranged in engagement with a groove formed in the inner surface of the flywheel 20 and engages the outer side of the mounting member 18 in order to hold the flywheel 20 on the mounting member and to clamp the retaining ring 23, the brake band 17, and the outer portion of the mounting member 18 in assembled relationship between the flywheel flange 21 and the retaining spring 23. Frictional damping of oscillations is obtained in this arrangement by a pair of nested arcuate spring elements 24 and 25 arranged within the brake band 17. The outer spring element 24 is formed on a diameter greater than the diameter of the inner surface of the brake band 17 and is adapted to be compressed and arranged within the brake band so as to be biased into frictional engagement with the inner surface thereof. The ends 26 of the arcuate spring element 24 are arranged in circumferentially spaced apart relationship and are inturned to provide projections for forming a driving connection with the shaft 15. The second arcuate spring 25 is formed on a diameter larger than the inner diameter of the arcuate spring element 24 and is compressed and arranged within the spring element 24, so as to be biased into frictional engagement therewith. The ends 27 of the inner spring element 25 are circumferentially spaced apart greater than the space between the ends of the outer spring element 26, as shown in Fig. 2, such that the ends of the spring element 27 will allow a limited amount of relative movement between the spring elements 24 and 25. A projection 28 is secured to the hub 29 on the shaft 15 and is arranged to engage the spring element 25 by engagement of projections 30 formed on the spring element 25 on each side of the projection 28 to provide for a friction damping of small oscillations of the shaft 15 by relative movement of the spring element 27 in engagement with the inner surface of the spring element 24. A second projection 31 is secured to the hub 29 on the shaft 15 and is arranged to engage the inturned ends 26 of the outer spring 24 which are formed as projections arranged on each side of the second hub projection 31 to provide a friction braking by engagement of the projection 31 with the spring ends 26 and relative movement of the spring element 24 in engagement with the inner surface of the brake band 17. Thus, for relatively small oscillations, a relatively smaller frictional braking or damping is provided by relative movement between the spring elements 24 and 25, and frictional damping is provided for greater oscillations by relative movement of the outer spring 24 in frictional engagement with the inner surface of the brake band 17 which provides a greater frictional damping effect on the oscillations. If desired, the projection 31 might be omitted and the damping of the larger oscillations might be obtained by engagement of the ends 27 of the inner spring 25 with the ends 26 of the outer spring element 24. However, it has been found desirable to provide the positive connection between the outer spring 24 and the hub 16 through the projection 31.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An oscillation damper for a rotatable shaft including a flywheel, means for rotatably supporting said flywheel about said shaft and in radially spaced relation thereto, an arcuate spring element arranged within said flywheel and biased into frictional engagement therewith, a second arcuate spring element arranged within said first-mentioned spring element and biased into frictional engagement therewith, and means on said shaft for providing a driving connection between said shaft and said second spring element for damping small oscillations of said shaft by frictional braking of said second spring element by movement thereof in engagement with a surface of said first-mentioned spring element, said shaft being arranged to engage said first-mentioned spring element by a lost-motion connection for providing a driving connection between said shaft and said first-mentioned spring element for damping larger oscillations of said shaft by frictional braking of said first-mentioned spring element by movement thereof in engagement with a surface of said flywheel.

2. An oscillation damper for a rotatable shaft including a brake band, means for rotatably supporting said brake band about said shaft and in radially spaced relation thereto, a flywheel mounted about said brake band and rotatable therewith, an element arranged within said brake band and biased into frictional engagement therewith, a second element arranged within said first-mentioned element and biased into frictional engagement therewith, and means on said shaft arranged to engage said second element for providing a driving connection between said shaft and said second element for damping small oscillations of said shaft by frictional braking of said second element by movement thereof in engagement with a surface of said first-mentioned element, said shaft being arranged to engage said first-mentioned element by a lost-motion connection for providing a driving connection between said shaft and said first-mentioned element for damping larger oscillations of said shaft by frictional braking of said first-mentioned spring element by movement thereof in engagement with a surface of said brake band.

3. An oscillation damper for a rotatable shaft including a flywheel, means for rotatably supporting said flywheel about said shaft and in radially spaced relation thereto, a spring element arranged within said flywheel and biased into frictional engagement therewith with the ends of said spring element arranged in circumferentially spaced apart relation, a second spring element arranged within said first-mentioned spring element and biased into frictional engagement therewith, means on said shaft arranged to engage said second spring element for providing a driving connection between said shaft and said second spring element for damping small oscillations of said shaft by frictional braking of said second spring element by movement thereof in engagement with a surface of said first-mentioned spring element, and second means on said shaft arranged to engage said first-mentioned spring element by a lost-motion connection for providing a driving connection between said shaft and said first-mentioned element for damping larger oscillations of said shaft by frictional braking of said first-mentioned spring element by movement thereof in engagement with a surface of said flywheel.

4. An oscillation damper for a rotatable shaft including a brake band, means for rotatably supporting said brake band about said shaft and in radially spaced relation thereto, a flywheel mounted about said brake band and rotatable therewith, a spring element arranged within said brake band and biased into frictional engagement therewith with the ends of said spring element arranged in circumferentially spaced apart relation, a second spring element arranged within said first-mentioned spring element and biased into frictional engagement therewith, means on said shaft arranged to engage said second spring element for providing a driving connection between said shaft and said second spring element for damping small oscillations of said shaft by frictional braking of said second spring element by movement thereof in engagement with a surface of said first-mentioned spring element, and second means on said shaft arranged to engage said first-mentioned spring element by a lost-motion connection for providing a driving connection between said shaft and said first-mentioned element for damping larger oscillations of said shaft by frictional braking of said first-mentioned spring element by movement thereof in engagement with a surface of said brake band.

5. An oscillation damper for a rotatable shaft including a flywheel, means for rotatably supporting said flywheel about said shaft and in radially spaced relation thereto, an arcuate spring element arranged within said flywheel and biased into frictional engagement therewith with the ends of said spring element inturned and arranged in circumferentially spaced apart relation, a second arcuate spring element arranged within said first-mentioned spring element and biased into frictional engagement therewith with the ends of said second spring element arranged in circumferentially spaced apart relation greater than the space between the ends of said first-mentioned spring element, and means on said shaft for providing a driving connection between said shaft and said second spring element for damping small oscillations of said shaft by frictional braking of said second spring element by movement thereof in engagement with a surface of said first-mentioned spring element, said shaft being arranged to engage said first-mentioned spring element ends for providing a driving connection between said shaft and one of said first-mentioned spring element ends for damping larger oscillations of said shaft by frictional braking of said first-mentioned spring element by movement thereof in engagement with a surface of said flywheel.

6. An oscillation damper for a rotatable shaft including a flywheel, means for rotatably supporting said flywheel about said shaft and in radially spaced relation thereto, an arcuate spring element arranged within said flywheel and biased into frictional engagement therewith with the ends of said spring element inturned and arranged in circumferentially spaced apart relation, a second arcuate spring element arranged within said first-mentioned spring element and biased into frictional engagement therewith with the ends of said second spring element arranged in circumferentially spaced apart relation greater than the space between the ends of said first-mentioned spring element, means on said shaft arranged to engage said second spring element for providing a driving connection between said shaft and said second spring element for damping small oscillations of said shaft by frictional braking of said second spring element by movement thereof in engagement with a surface of said first-mentioned spring element, and second means on said shaft arranged to engage said first-mentioned spring element ends by a lost-motion connection for providing a driving connection between said shaft and one of said first-mentioned element ends for damping larger oscillations of said shaft by frictional braking of said first-mentioned spring element by movement thereof in engagement with a surface of said flywheel.

7. An oscillation damper for a rotatable shaft including a brake band, means for rotatably supporting said brake band about said shaft and in radially spaced relation thereto, a flywheel mounted about said brake band and rotatable therewith, an arcuate spring element arranged within said brake band and biased into frictional engagement therewith with the ends of said spring element inturned and arranged in circumferentially spaced apart relation, a second arcuate spring element arranged within said first-mentioned spring element and biased into frictional engagement therewith with the ends of said second spring element arranged in circumferentially spaced apart relation greater than the space between the ends of said first-mentioned spring element, and means on said shaft arranged to engage said second spring element for providing a driving connection between said shaft and said second spring element for damping small oscillations of said shaft by frictional braking of said second spring element by movement thereof in engagement with a surface of said first-mentioned spring element, said shaft being arranged to engage said first mentioned spring element ends for providing a driving connection between said shaft and one of said first-mentioned spring element ends for damping larger oscillations of said shaft by frictional braking of said first-mentioned spring element by movement thereof in engagement with a surface of said brake band.

8. An oscillation damper for a rotatable shaft including a brake band, means for rotatably supporting said brake band about said shaft and in radially spaced relation thereto, a flywheel mounted about said brake band and rotatable therewith, an arcuate spring element arranged within said brake band and biased into frictional engagement therewith, a second arcuate spring element arranged within said first-mentioned spring element and biased into frictional engagement therewith, means including a projection secured to said shaft and projections on said second spring element on each side of said shaft projection for providing a driving connection between said shaft and said second spring element for damping small oscillations of said shaft by frictional braking of said second spring element by movement thereof in engagement with a surface of said first-mentioned spring element, and means including a second projection secured to said shaft and projections on said first-mentioned spring element on each side of said second shaft projection spaced apart a distance greater than the width of said second shaft projection and said second spring element projections providing a driving connection between said second shaft projection and one of said projections on said first-mentioned spring element for damping larger oscillations of said shaft by frictional braking of said first-mentioned spring element by movement thereof in engagement with a surface of said brake band.

9. An oscillation damper for a rotatable shaft including a brake band, means for rotatably supporting said brake band about said shaft and in radially spaced relation thereto, a flywheel mounted about said brake band and rotatable therewith, an arcuate spring element arranged within said brake band and biased into frictional engagement therewith with the ends of said spring element inturned and arranged in circumferentially spaced apart relation, a second arcuate spring element arranged within said first-mentioned spring element and biased into frictional engagement therewith with the ends of said second spring element arranged in circumferentially spaced apart relation greater than the space between the ends of said first-mentioned spring element, means on said shaft arranged to engage said second spring element for providing a driving connection between said shaft and said second spring element for damping small oscillations of said shaft by frictional braking of said second spring element by movement thereof in engagement with a surface of said first-mentioned spring element, and second means on said shaft arranged to engage said first-mentioned spring element ends by a lost-motion connection for providing a driving connection between said shaft and one of said first-mentioned element ends for damping larger oscillations of said shaft by frictional braking of said first-mentioned spring element by movement thereof in engagement with a surface of said brake band.

10. An oscillation damper including a rotatable shaft, a hub secured to said shaft, a brake band, means for rotatably supporting said brake band on said hub in radially spaced relation thereto, a flywheel mounted about said brake band and rotatable therewith, an arcuate spring element arranged within said brake band and biased into frictional engagement therewith with the ends of said spring element arranged in circumferentially spaced apart relation, a second arcuate spring element arranged within said first-mentioned spring element and biased into frictional engagement therewith with the ends of said second spring element arranged in circumferentially spaced apart relation greater than the space between the ends of said first-mentioned spring element, means including a projection secured to said hub on said shaft and projections on said second spring element on each side of said hub projection for providing a driving connection between said hub and said second spring element for damping small oscillations of said shaft by frictional braking of said second spring element against the surface of said first spring element, and means including a second projection secured to said hub on said shaft and projections on said first-mentioned spring element on each side of said second hub projection spaced apart a distance greater than the width of said second hub projection and than said second spring element projections for providing a driving connection therebetween on engagement of said second hub projection with either of said projections on said first-mentioned spring for damping larger oscillations of said shaft by frictional braking of said first-mentioned spring element by movement thereof in engagement with a surface of said brake band.

EDWIN N. OLSON.